April 9, 1957

E. F. FRESONE ET AL 2,788,427

ELECTRIC ROASTERS

Filed Jan. 21, 1953

INVENTORS
Eduardo F. Fresone and
BY Raul Iza, Jr.
Albert Jacobs
Atty.

INVENTORS
Eduardo F. Fresone and
Raul Iza, Jr.
BY Albert Jacobs
atty.

2,788,427
ELECTRIC ROASTERS

Eduardo Francisco Fresone and Raul Iza, Jr., Buenos Aires, Argentina

Application January 21, 1953, Serial No. 332,316

4 Claims. (Cl. 219—20)

The present invention relates to electric stoves, and more particularly to an electric roaster, constituted by a broiler formed by a resistor, the extremities of which are connected to the outlet of a secondary transformer of high intensity and low voltage.

When specially referring to broilers or grids, it is understood that the device of the invention is particularly adapted for roasting meat, being, therefore, a practical means for preparing the well-known broiled steaks and the like.

The present electric broilers are provided with a heating means formed by a long and thin resistor which is connected with a source of electric current. In accordance with the characteristic of said resistor, it is impossible to place the meat to be roasted directly thereon, as said resistors possess a very low mechanical resistance and, when they are connected, they at once get red hot with small accumulation of caloric quality, which causes the burning of that part of the meat which is in direct contact with the resistor, whilst the interior of the meat remains in a raw state.

The grid of this invention overcomes these disadvantages, as it is based on forming the grid of a thick iron bar which possesses the necessary mechanical resistance for receiving the product to be cooked, with the characteristic that said bar is instantly heated when it is interposed in the secondary circuit of a transformer of low power and high intensity, with its extremity connected to the outlet of a coil of the secondary of said transformer. It is understood that the invention is based on an assembly constituted by the grid formed with the resistor coupled to the outlet of a transformer, able to carry the usual canalization current to that current which offers the necessary characteristics in accordance with the needs of the feeding source of energy.

The applying of a transformer of the type mentioned for feeding the grids repersents a great advantage because in this manner a large resistor may be employed, which possesses the necessary mechanical resistance for directly supporting the weight of the food to be cooked, as well as any secondary pressure derived from the pressure of the food on the grid, or from the action of pronging the food in order to lift it once it is cooked.

The best result is obtained by employing, as the grid-resistor, a cylindrical iron bar of five to seven millimeters in diameter; with a bar of these characteristics, approximately shaped, a grid can be formed on which the food is directly placed and which can be very rapidly heated when connected to a low power current of high intensity; the operation of cooking is completed in a rapid manner, a steak only requiring one minute for cooking.

Better results are obtained when the device is formed of two grids disposed in such a manner that one of them may be opened in order to permit the placing of the food and closed in order to press the meat between the two grids, which are simultaneously heated, so as to exert a cooking effect on both faces of the food placed for cooking.

Within the scope of this invention, it may be said that these cookers may be used in restaurants and other establishments where large quantities of food must be prepared in a short period of time. This automatic arrangement is very partical although somewhat expensive, for which reason it is not advisable for home use. In homes, a device provided with only one grid, or even two grids, may be efficient, but not automatized, the cost being relatively economical and the action being rapid.

In the following specification, a detailed description will first be made of an automatic device, this being the most interesting one; followed by the descrption of a simpler model which operates on the same principles.

Figure 1:
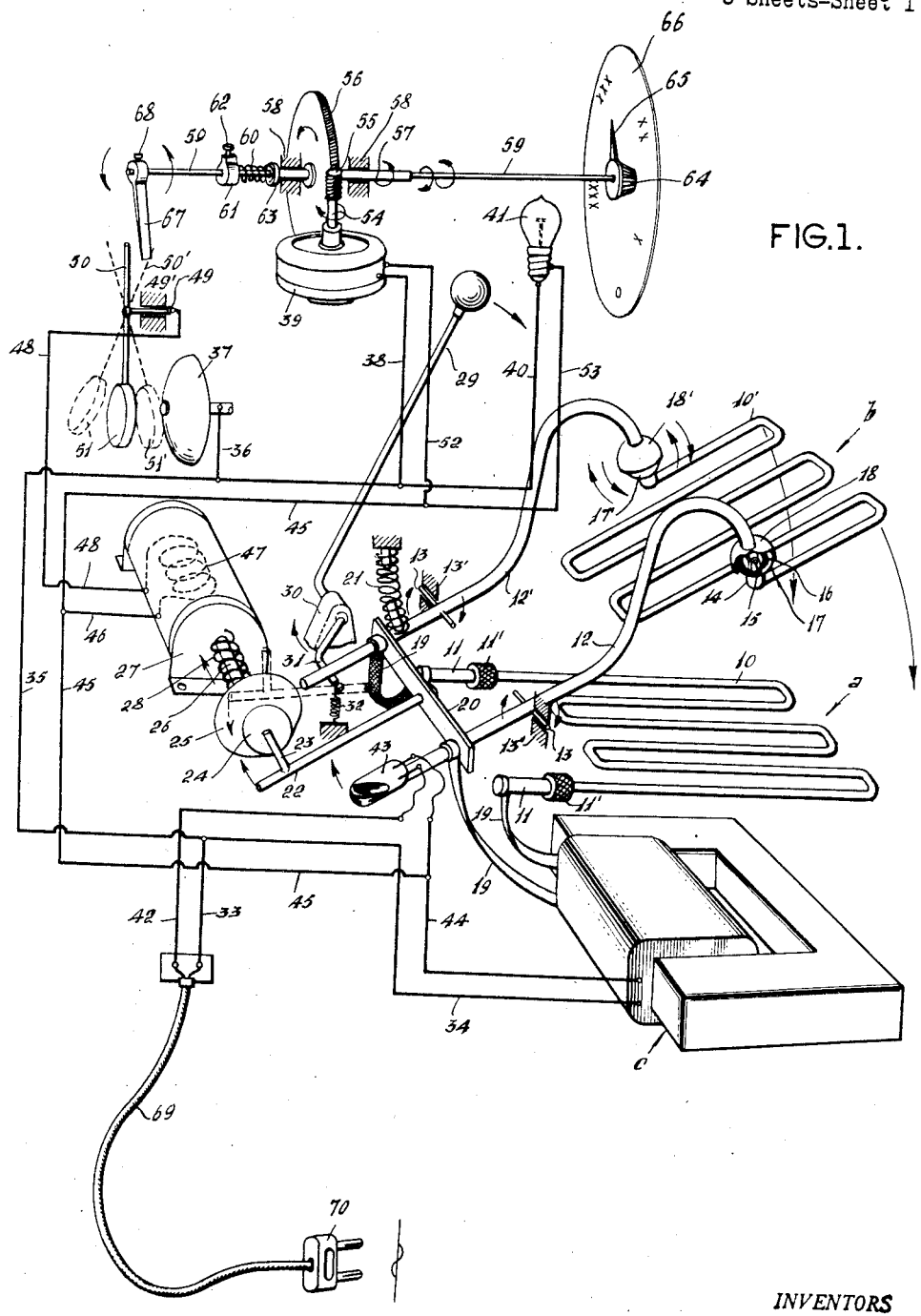
Fig. 1 is a plan view of a double automatic grid which is constructed and operated in accordance with the principles of this invention.

With reference to Fig. 1 it may be stated that the invention is constituted of a fixed grid $a$ formed by a bar 10 of metal of low conductivity, such as iron, shaped in the manner shown by the drawing, so as to form said grid. The extremities of the bar 10 are coupled to supports 11 of a good conducting metal, such as bronze, and secured by unions 11'; a second grid $b$, also formed by a bar of low conductivity 10', is placed over grid $a$; this grid $b$ is not rigidly mounted but is supported by two bronze basculating arms 12—12' which rotate about axes 13 supported by bearings 13', shown schematically; apart from the movement allowed by the supports, the grid $b$ is able to effect another movement, derived from the fact that it is fixed to arms 12—12' in an articulated manner; thus, as shown in the drawing, the bar 10' ends, on one side, in a bent end 14 which is united at the extreme end of arm 12 by a small axis 15 inserted in a perforation existing in the extreme ends of the bars to be united, thus forming an articulated connection in order to insure a good electrical contact, the outermost end of bar 10' and that of arm 12 are connected by means of a wide copper mesh 16. This connection is protected by two small caps 17 and 18 whilst the other end of bar 10' is connected in an identical manner to the arm 12', only the two protective caps 17' and 18' being visible; as the lower caps are of a smaller diameter than the upper ones, the grid $b$ moves up or down on the extreme ends of arms 12—12', thus representing an advantage which will be appreciated hereinafter.

The grids $a$ and $b$ are connected in series, through flexible copper meshes 19 to a secondary outlet of a transformer $c$ of low potential and high intensity; as the bars which form the grids $a$ and $b$ are, in reality, thick resistors, when these are interposed in the transformer circuit outlet $c$ the temperature is rapidly elevated, producing the necessary heat for the cooking action of the grids. It is obvious that, in practice, the characteristics of transformer $c$ must be adjusted to the determined potential and intensity required in accordance with the length and cross-section of bars 10—10, which form the grids $a$ and $b$ and to the necessary heating characteristics thereof; in general, it may be mentioned that very good and rapid cooking results are obtained with the heat produced in the grids when the bars forming the same are fed with a current of one volt for every fifty centimeters of length of the bars, and with an intensity of five to six amperes per square millimeter of cross-section. It is understood that the grids may be coupled in parallel instead of in series and that, in such case, this detail must be kept in mind when calculating the necessary characteristics of the transformer.

The mechanical arrangements of the grids is completed in the following manner: the relative position of arms 12—12' is obtained through a transverse bar 20 of an electric insulating material, the extreme ends of which are solidly fixed to said arms; a spring 21, conveniently disposed, permanently urges arms 12—12', to occupy the corresponding position in the opening of grid b. Centered in transverse bar 20 is fixed a metallic bar 22 which ends in a transverse piece 23 against which rests the minor base 24 of a truncated conic stop plate 25 secured to the outer end of a movable rod 26 of a suction electromagnet 27; a spring 28, encircling the rod 26, permanently forces the truncated conic stop plate 25 to press against the transverse piece 23, which, in turn, limits the range of movement of rod 26.

A lever 29, mounted on a fulcrum 30, has its arm 31 fixed below the posterior extremity of arm 12'. By virtue of this arrangement, when lever 29 is lowered, the arm 31 causes the posterior part of arm 12' to rise, which, together with arm 12, rotates on axis 13 and lowers the front arm part, effecting the lowering of grid b which is thus set in a position close to and parallel to the grid a, as shown in the dotted lines of Fig. 2; together with the posterior part of arms 12—12' the rod 22 is elevated and the transverse piece 23 slides over the surface 24 until the moment at which the rod 22 overpasses the limit line of the minor base 24; from this moment, whilst rod 22 is rising, it permits the truncated conic stop plate 25 to advance owing to the action of spring 28; if at this moment the lever 29 is released, it will return to its initial position due to spring 32 acting on arm 31; however, the grid b will be maintained in the lowered position due to rod 22 being locked by the truncated conic stop plate 25 and the expansion pressure of spring 28 will be so strong that it cannot be overcome by the pressure of spring 21 on the rear part of arm 12' and bar 22; it is understood that this result will be obtained by the correct selection of the respective tensions of springs 21 and 28.

The returning of grid b to its initial opened position will result from the operation of the automatic electromechanical system which will be described.

An inlet conductor 33 has an extension 34 connected in a direct manner to the primary coil of the transformer c; a second extension 35 has a branch 36 connected to a bell 37; another branch 38 is connected to a pole of the electric motor 39 and a third branch 40 is connected to a pole of the electric lamp 41. The other admission conductor 42 is directly connected to a mercury interrupter switch 43 fixed to the posterior part of arm 12 and disposed in such a manner that it opens the circuit when the grid b is in an elevated position, and closes it when it is lowered; from the switch 43 emerges a conductor 44 connected to the other end of the coil of the primary of transformer c; an extension 45 has a branch 46 connected to one end of coil 47 of the electromagnet 27; from the other end of this coil there is a conductor 48 which is coupled to axis 49 supported by bearing 49'; on the axis 49 is fixed a rod 50 which supports the clapper of a bell 51; the extension 45 has another branch 52 which is connected to the second pole of the motor 39 and a third branch 53 which is connected to the second pole of the electric lamp 41.

The timer of the automatic roaster is formed by a synchronous motor 39, the shaft 54 of which terminates in an endless screw 55, related to a toothed wheel 56; the endless screw 55 and the wheel 56 are calibrated in such a manner between each and the velocity of speed of the motor that, when the motor is operating, the toothed wheel 56 will rotate with a velocity of one or two revolutions per minute; the wheel 56 is fixedly secured to shaft 57 which turns within the bearings 58; the shaft 57 is hollow and its interior is traversed by a rod 59 which, alongside wheel 56, is provided with a spring 60 the tension of which is regulated by the position of stop 61 fixed by a set screw 62 which presses directly onto the rod 59; the spring 60 maintains a permanent pressure on a small stop plate 63 fixed on shaft 57; this pressure is such that when wheel 56 and shaft 57 revolve, it drags the rod 59 compelling it to rotate at the same velocity; however, the pressure of spring 60 does not prevent the rod 59 from being rotated freely when manual action is exerted thereon, either during the movement of wheel 56 or when same is stopped.

Rod 59 is provided at its forward end with a coupling piece 64 on which is affixed an indicator needle 65 movable on a dial 66; the posterior part of rod 59 terminates in a small transverse plate 67 fixed by a set screw 68; by loosening screw 68 it is possible to slide the plate 67 on the rod 59 in order to align it with the rod 50; the length of the plate 67 is such that, when it rotates with rod 59 and reaches the lowest part of its course, one end strikes the extreme end of rod 50 causing it to revolve on axis 49, carrying it to the position shown in dotted lines and indicated under 50'; continuing the rotation of plate 67, its end again frees rod 50, which, executing a pendular movement, brings the clapper of bell 51 to a contact position with bell 37; the bar continues oscillating until it is detained in the position in which, by gravity, the clapper 51 compels it to remain.

The electric circuit is completed by a flexible cord 69 and the electric plug 70.

The automatic grid which has been described is preferably employed in preparing bovine and porcine steaks and can also be used for sausages as well as for any other meat products; it also serves as a bread toaster and for hot sandwiches which can be prepared in a few seconds.

In practical use, the device operates in the following manner:

The electric plug 70 is connected to the alternating current line of general use either of 110 or 220 volts or any other voltage employed generally, but it is obvious that the transformer c will possess characteristics in accordance with the current employed; once the connection is made and the grid b is in an open position, the interrupter switch 43 will maintain the circuit open and no part of the device will be fed by the electric current; the coupling piece 64 is turned in order to set the needle 65 in line with the cooking time required and marked on dial 66; in this position the needle 65 will correspond to a determined position of the plate 67 and the operating time of the device will be in accordance with the arc that said plate 67 will describe until it meets the rod 50; the apparatus is thus set ready for the cooking operation.

The material to be cooked, say for instance a steak, is then placed on the grid a and the lever 29 is lowered, forcing the grid b to be lowered until it presses the steak against the grid a; the movement of grid b on the arms 12—12' will allow said grid b to obtain the greatest possible pressing effect, even if said position does not correspond exactly as a parallel to grid a. When lowering grid b the bar 22 will have been elevated until it overpasses the limit of the minor base 24 of the truncated conic stop plate 25 which, impelled by spring 28, will advance in order to act as a stop in the descent of rod 22; if at that moment the lever 29 is released, it will return to its natural position due to action of spring 32, but the grid b will not be able to be opened as this is prevented by the advanced position of the truncated conic stop plate 25; the conicity of this retaining stop plate allows grid b to reach a pressing position on the steak and be fixedly held in this position, irrespective of the thickness of said steak.

When grid b is lowered, the position of the interrupter switch 43 will be altered, closing the electric circuit, connecting transformer c, putting in operation motor 39 and lighting the electric lamp 41 which light, seen through the transparent dial 66, will indicate that the device is functioning; the electromagnet will be unenergized because the circuit of its coil 47 will be open whilst the bell clapper 51 does not register contact with bell 37.

As soon as motor 39 commences to operate, the wheel 56 will rotate carrying the rod 59 and, consequently, the transverse plate 67 which will commence to describe an arc, the amplitude of which will have been predetermined on the dial; when the transverse plate 67 reaches its lowest point, it will force bar 50 to execute the movement already described, and the bell clapper 51 will be displaced to the position marked with dotted lines under reference character 51', contacting the bell 37; when this contact has taken place, the circuit of coil 47 will be closed, energizing the electromagnet 27; the rod 26 will be attracted and will draw the truncated conic stop plate 25, which upon retraction will free the bar 22, allowing spring 22 to act so as to open the grid b; when the rear part of arm 12 is lowered, the interrupter switch 43 will open the circuit, so that the transformer c will cease operating and the grids will begin to cool, the motor 39 will be stopped, the electromagnet 27 will be deenergized allowing spring 28 to act in order to advance the truncated conic stop plate 25 until its base 24 abuts the transverse piece 23, in order to be ready for the next operation. The extinguishing of the electric lamp 41 and the sound of the bell 37 will inform that the cooking operation is ended.

The practical realizations of the grid device which have been shown schematically must be mounted on a convenient framework, which can be of any type. However, the form shown respectively in elevation and plan in Figs. 2 and 3 is preferred.

According to these figures, the machines is formed with a general base 71 which includes the transformer c the secondary of which is connected to the grids a and b; the transformer c is mounted on a support 72. On the base 71 is fixed a chassis 73 which fixedly holds the bars 11 to which grid a is coupled; this coupling is made by unions 11' which operate detachably so as to allow the removal of the grid a for cleansing purposes, or changing of same when it has been deteriorated through use; in the same chassis 73 are fixed the bearings 13' which support the rotating axis 13 of the arms 12—12'; a plate 74 serves as a support for spring 21 which permanently forces arms 12—12' to open position; in the same chassis 73 may be found the base 75 which supports the electric lamp 51; a long bar 76 acts as a support for motor 39 and rod 50, at one end of which is the belt clapper 51; from the same bar 76 a support is derived which sustains the bearings of axis 57 of the toothed wheel 56; the other parts of the device, shown schematically in Fig. 1, are also disposed in the same chassis 73; these parts are protected by a housing 77 which, in the front part, has an opening into which fits the transparent dial 66; the coupling piece 64 is disposed in the front part of the housing 77 in an accessible manner for the operator; the housing 77 has an opening through which the lever 29 can be thrust towards the front; the wiring 69 and electric plug 70 emerge to the exterior from the rear part of the apparatus.

Figure 2:
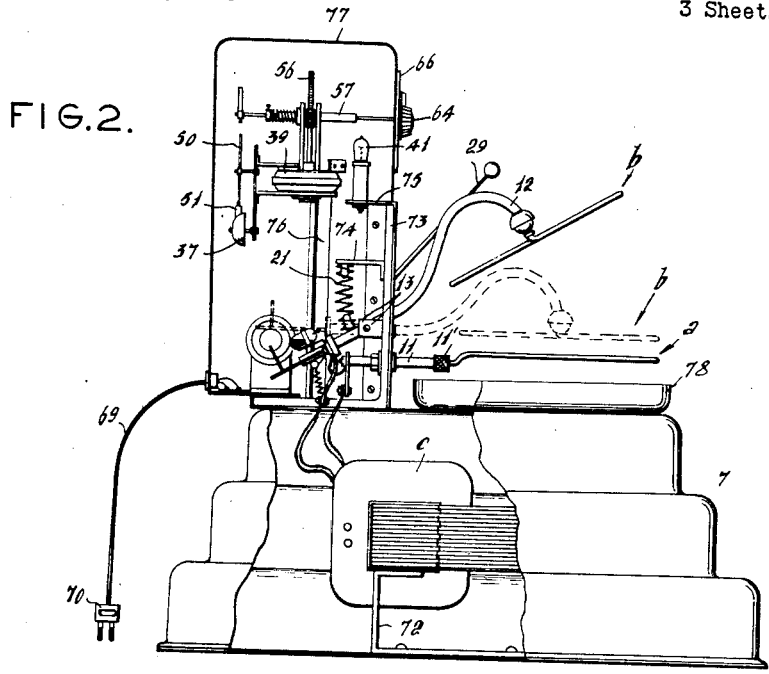
Fig. 2 is an elevational side view, with parts broken away, of the device shown in Fig. 1, mounted on a base and provided with a protective housing.
Figure 3:
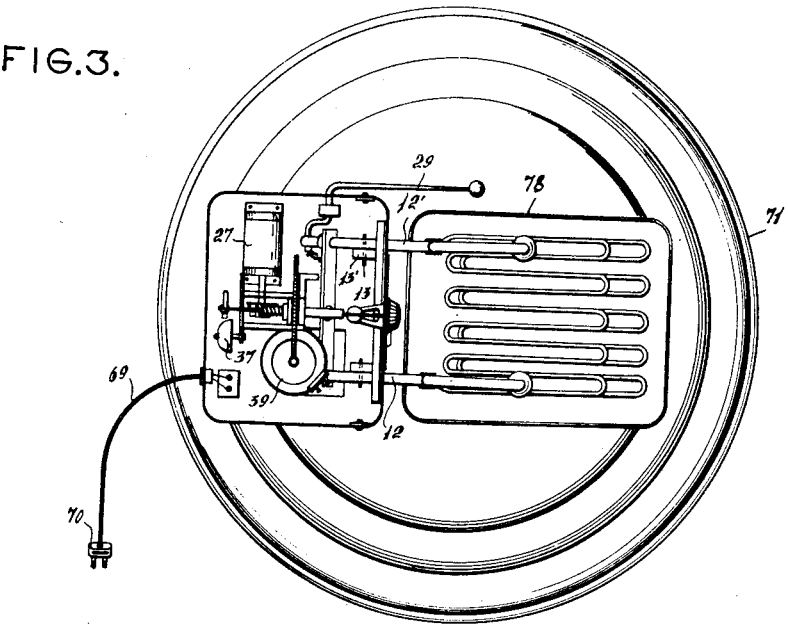
Fig. 3 is a plan view of the device of Fig. 2 with the protective housing of the mechanism opened.

In Fig. 2 the grid b is shown in an open position; the same grid b is shown in broken lines in the position occupied during the use of the machine, that is, when pressing the food to be cooked.

On the base 71 and under grid b a receptacle 78 is set in order to collect the liquid matter which eventually may drop from the food during cooking.

The electric circuit as well as the mechanical disposition of the different parts of this device are in every way similar to those shown in Fig. 1; it is therefore unnecessary to enter into greater details as to the characteristics of the device shown in Figs. 2 and 3; the operation of this machine is the same as that which has been stated above.

In order to limit the important details of this machine, it may be stated that when the grids a and b are formed by cylindrical iron bars of 5 millimeters diameter divided in two pieces which together reach a total length of 3 meters, and are connected in series to the output of a transformer secondary of such characteristics that it is able to impart an electric current with an approximate power of 7 volts and an approximate intensity of 120 amperes, the device is able to operate the proper cooking of a steak in one minute and a sausage in 30 seconds; the rapidity of this operation in conjunction with the automatic manner in which the device is run, results in the fact that this apparatus is exceedingly practical for use in an establishment where there are numerous food consumers.

Figure 4:
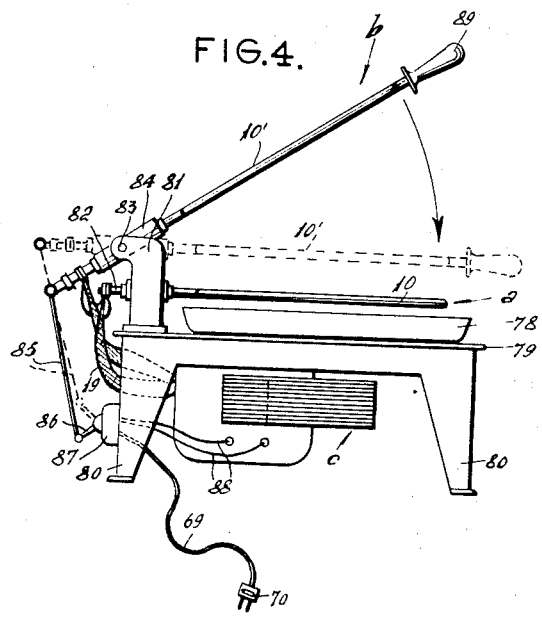
Fig. 4 is a side view of a simplified model of a double grid in accordance with this invention.

The same efficient results may be obtained in a simplified type shown in Fig. 4 in which, as in the former case, it is formed by two grids a and b coupled in series or parallel to the transformer c of low power and high intensity. The device is mounted on a small base 79, on legs 80; below the base 79 is fixed the transformer c and on the same there is a support 81 of insulating material; this support 81 holds in a fixed manner the bars 82 to which is coupled the rod 10 constituting the fixed grid a; said support 81 forms, on the top part, a bearing on which rotates axis 83 which acts as articulating means of supports 84, to which are coupled the extreme ends of the bar 10' forming the movable grid b; in the rearmost part of one of the supports 84 there is an articulated rod 85 which, in turn, is articulated to the lever 86 which operates the interrupter switch 87 interposed between the electric current entrance 69 and conductors 88 connected to the coil of the primary of the transformer c; as in the former case, the grids a and b are connected to the outlet of the secondary of the transformer, by means of flexible copper meshes 19; for operating grid b there is an operating handle 89, conveniently made of an athermanous material. Under the grid a is placed a receptacle 78 in order to collect any liquid which may emanate from the food whilst being cooked.

In practical use, the plug 70 is connected whilst the grid b is in an open condition which corresponds to the interrupted action of switch 87; the food to be cooked is placed on the grid a; by means of handle 89, the grid b is lowered until it presses on the food on grid a; the grid b will occupy approximately the position shown by dotted lines in the design; when lowering grid b, the interrupter switch 87 begins operating, the electric current passing through transformer c; this active position is maintained for the necessary time, pressing on handle 89; when the food is cooked, the grid b is opened and the food taken out; the grid b may be maintained in an opened position by any well known means, such as a spring or a counterweight, not shown; as stated, in this opened position the electric current to transformer c will be cut off, and the operation may be repeated as many times as required.

Figure 5:
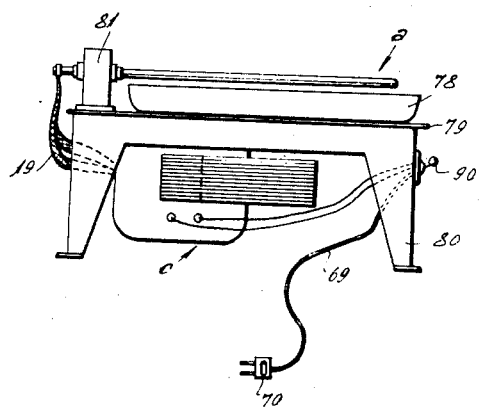
Fig. 5 shows a side view of a simple model of grid which operates in accordance with the principles of this invention.

The form shown in Fig. 5 is even simpler than the previous one and the cost is more economical; in this case the device is formed by only one fixed grid a and completed with the details shown in the figure, which needs no description in order for it to be understood; a simple interrupter switch 90, manually operated, allows the control of the passage of electric current to transformer c which is permanently coupled to the single fixed grid a; the use of same is made by simply putting the piece of meat on the grid a and closing the circuit through switch 90; the grid is rapidly heated and in order to take advantage of its heat, pressure may be exerted similar utensil; when one side is cooked, it is turned over; the cooking operation on the one grid cooker is slower than that of the double one, but it has the advantage of being much cheaper and easier to manufacture.

It may be stated, however, that the low voltage current employed does not represent danger of any kind, and the only care which must be taken is that of not touching the grid during the time it is heated, as one may run the risk of a burning which, on the other hand, is a risk common to any grids, irrespective of the means by which they are heated. The harmless conditions of the electric current of low power with which all the grids herein mentioned are operated, is well known to all who understand electricity.

It is obvious also that the grid can be made by means of several pieces of iron bars, which may be united in series or parallel by means of good electrical conducting masses, such as brass. This form has not been illustrated or described in detail, for anyone understanding the art will be aware that the assembling of a grill of this characteristic does not present any difficulty.

We claim:

1. An electric roaster comprising a pair of thick rod-like resistors each of which is bent into the form of a grid, a transformer of low output voltage to which the resistors are coupled at their extremities, means for moving said grids relatively to one another to cause them to open and close and means for causing such movements to assume an arcuate path, the said grids being free of any direct connection to one another the grids and transformer being connected into a common electrical circuit and means incorporated in said circuit for automatically effecting relative movement of said grids after a pre-selected time interval.

2. An electric roaster in accordance with claim 1 in which a switch is interposed in said circuit for interrupting the flow of electricity after relative movement of said grids has occurred adequate to provide access therebetween.

3. An electric roaster comprising a fixed grid, a movable grid, means for mounting said movable grid for arcuate approaching and withdrawing movements with respect to said fixed grid, an electrical circuit into which said grids are connected, a transformer of low voltage output in said circuit, electrical connections between said grids and transformer, means for interrupting the flow of current in said circuit after a pre-selected time interval and means for electrically disconnecting said movable grid when it is raised appreciably above a horizontal position the said grids being free of any direct connection to one another.

4. An electric roaster in accordance with claim 3 in which means is interposed in said electrical circuit for signalling the termination of the pre-selected time interval, said interrupting and signalling means being interconnected and interdependent.

References Cited in the file of this patent

UNITED STATES PATENTS

| Number | Name | Date |
|---|---|---|
| 416,360 | Dewey | Dec. 3, 1889 |
| 497,790 | Jenkins | May 23, 1893 |
| 1,610,851 | Ehrgott | Dec. 14, 1926 |
| 1,978,872 | Wharton | Oct. 30, 1934 |
| 1,979,501 | Stepkin | Nov. 6, 1934 |
| 2,489,500 | Polliam | Nov. 29, 1949 |
| 2,630,515 | McCormick | Mar. 23, 1953 |
| 2,642,794 | Spiess et al. | June 23, 1953 |